(12) United States Patent
Wu

(10) Patent No.: US 6,882,331 B2
(45) Date of Patent: Apr. 19, 2005

(54) PROJECTOR WITH ARRAY LED MATRIX LIGHT SOURCE

(76) Inventor: Jiahn-Chang Wu, No.15, Lane 13, Alley 439, Her-Chiang Street, Chutung, Hsin-Chu (TW), 310

( * ) Notice: Subject to any disclaimer, the term of this patent is extended or adjusted under 35 U.S.C. 154(b) by 298 days.

(21) Appl. No.: 10/139,780

(22) Filed: May 7, 2002

(65) Prior Publication Data

US 2003/0210213 A1 Nov. 13, 2003

(51) Int. Cl.⁷ .......................... G09G 3/32; H04N 9/31; H01J 63/04; G02F 1/1333; G02F 1/1343
(52) U.S. Cl. .................... 345/82; 345/83; 348/744; 313/483; 313/500; 313/505; 349/58; 349/69; 349/139; 349/140; 349/141; 349/142; 349/143
(58) Field of Search .................... 345/82, 83, 102; 348/744, 745, 746, 747, 748, 749; 313/483–512; 349/58, 69, 139–143

(56) References Cited

U.S. PATENT DOCUMENTS

| | | | | |
|---|---|---|---|---|
| 4,445,132 A | * | 4/1984 | Ichikawa et al. | 257/72 |
| 4,485,377 A | * | 11/1984 | Claus et al. | 345/82 |
| 5,105,430 A | * | 4/1992 | Mundinger et al. | 372/35 |
| 6,219,186 B1 | * | 4/2001 | Hebert | 359/618 |
| 6,224,216 B1 | * | 5/2001 | Parker et al. | 353/31 |
| 6,538,682 B1 | * | 3/2003 | Ohkubo | 347/241 |
| 6,547,400 B1 | * | 4/2003 | Yokoyama | 353/98 |
| 6,578,986 B1 | * | 6/2003 | Swaris et al. | 362/249 |
| 6,643,302 B1 | * | 11/2003 | Nishikawa et al. | 372/35 |
| 2002/0064032 A1 | * | 5/2002 | Oohata | 361/760 |
| 2002/0171941 A1 | * | 11/2002 | Okada | 359/641 |

* cited by examiner

Primary Examiner—Henry N. Tran
Assistant Examiner—Peter Prizio, Jr.
(74) Attorney, Agent, or Firm—Hung Chang Lin

(57) ABSTRACT

A light emitting diode matrix array is used as the light source of a picture projection system. Each cell of the LED matrix array has an assembly of one or more red, green and blue LEDs with metal lead structures to individually energize these LEDs. The lights emitted from the LED assembly is transmitted through one or more programmable liquid crystal plate or digital micro-mirror device to control the light transmission, and then merged together for projection as a pixel onto a screen.

8 Claims, 22 Drawing Sheets

Fig. 11.
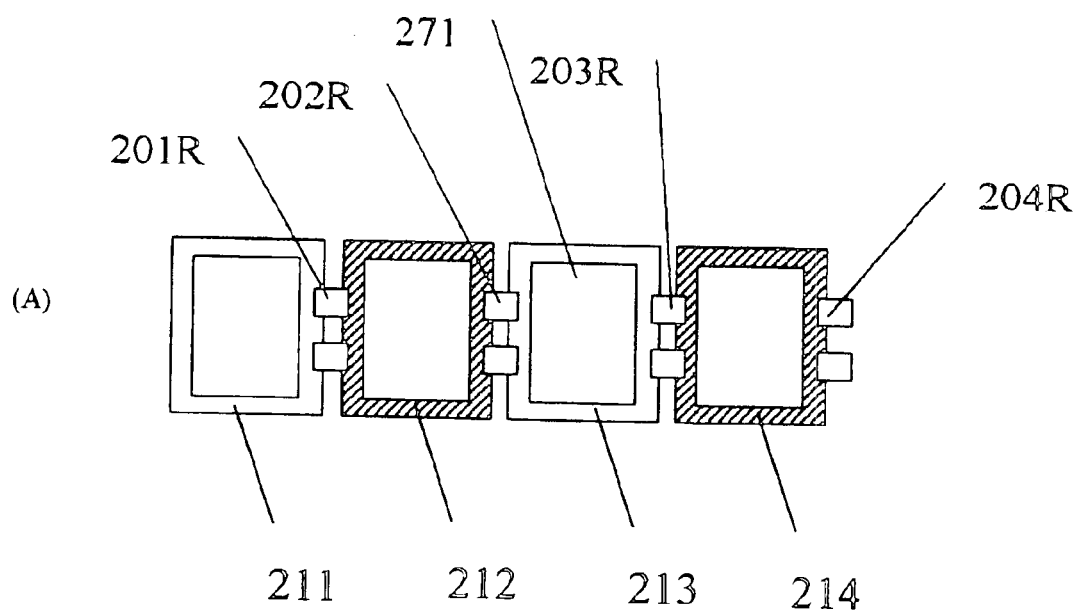
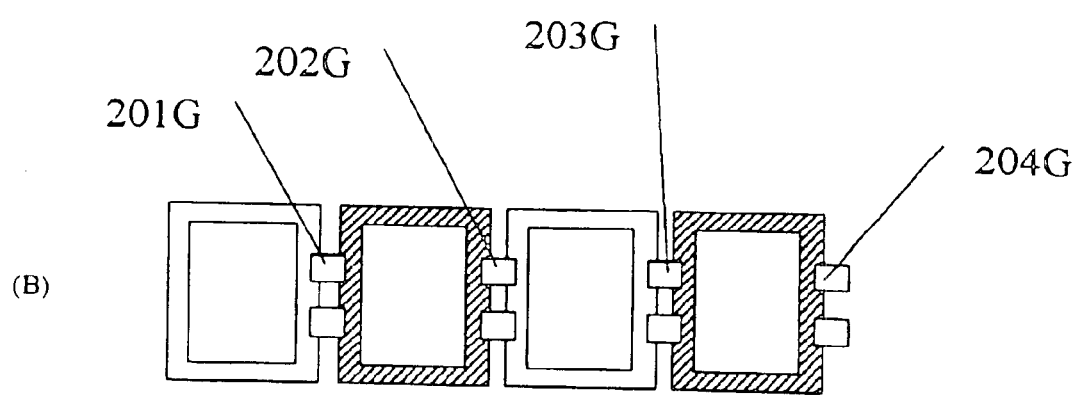

圖 19.

PROJECTOR WITH ARRAY LED MATRIX LIGHT SOURCE

BACKGROUND OF THE INVENTION (1) Field of the Invention

This invention relates to light source of a projector, in particular to the use of light emitting diode matrix as light source. This patent application is co-pending with U.S. patent application Ser. No. 09/982,371, filed Oct. 19, 2001; now U.S. Pat. No. 6,650,048.

(2) Brief Description of Related Art

FIG. 1 shows a prior-art three-gun projector unit 100 for color display. A projector lamp 10 projects a full color light beam L to a prism 11, which splits the light into a blue light beam B, green light beam G and red light beam R. The split light beams B, G, R pass through three transmissive liquid crystal display plates 12B, 12G, 12R, respectively, which control the timing and the amount of transmission through each plate. The transmitted light beams transmit past three corresponding lens 15B, 15G, 15R and project onto a screen 18 to display a full color picture. By changing the transmission through each liquid crystal plate rapidly with time, the display on the screen presents a motion picture like that in a television or movie.

FIG. 2 shows the structure of a traditional lamp 10 for the projector shown in FIG. 1. The filament 102 is located near the socket 101 of the lamp with a lamp shade 103. From the standpoint the energy efficiency, environmental protection and desirability for higher light intensity, the traditional filament-type projection lamp suffers from high energy consumption and overheating.

SUMMARY OF THE INVENTION

An object of this invention is to provide a light source for a projector which is more energy efficient. Another object of this invention is to provide a light source for a projector which is simpler in structure. Still another object of this invention is to provide a light source for a projector which is environmentally desirable. A further object of this invention is to provide a light source for a project projector capable of higher light intensity.

The objects are achieved by using a matrix array of light emitting diodes (LED) as the light source cells for a projector. Each cell of the array comprises an assembly of one or more red LEDs, green LEDs and blue LEDs with metal leads to energize these LEDs individually. The emitted lights from the LED assembly are transmitted through programmable liquid crystal plates or digital micro-mirror devices to control the amount of light transmission, and then merged together for projection onto a viewing screen as a picture element (pixel). Such a light source simplifies the structure, consumes less energy, environmentally desirable, and is capable of higher light intensity.

BRIEF DESCRIPTION OF THE SEVERAL VIEWS OF THE FIGURES

FIG. 10(A) and FIG. 10(B) differ in the use of different chips to emit different colors.

FIG. 11 shows a seventh embodiment of the LED assembly; FIG. 11(A) and FIG. 11(B) differ in the use of different chips to emit different colors.

FIG. 12(A) and FIG. 12(B) differ in the use of different chips to emit different colors.

DETAILED DESCRIPTION OF THE INVENTION

Figure 3:
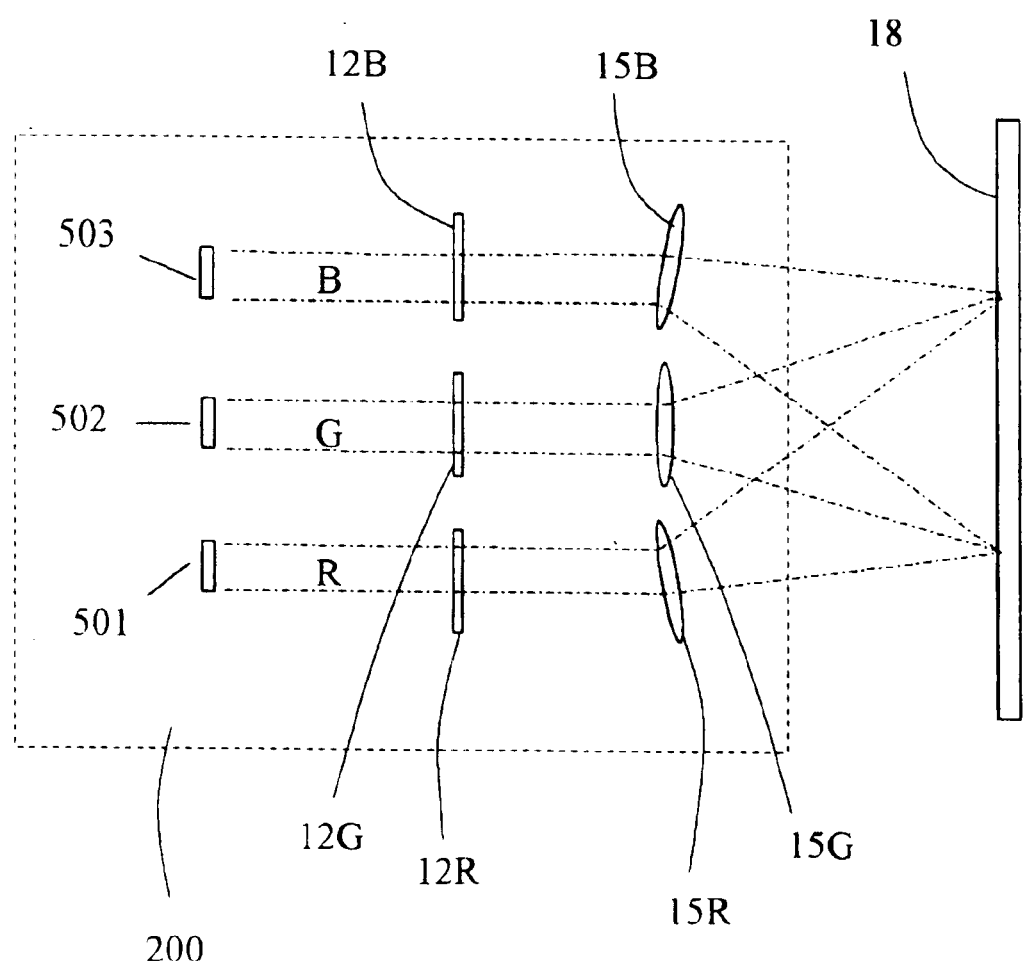
FIG. 3 shows the basic LED cell of the light source of the present invention.

FIG. 3 shows the basic unit 200 of a matrix of light emitting diodes (LED) to form the light source cell of a color picture projector. Three primary color red R), green(G), blue (B) LED packages are mounted in a matrix formation in a module 200 as a three-gun light emitting light source. The B, G, R LEDs 503, 502, 501 emit individually light beams through three transmissive liquid crystal plates 12B, 12G, 12R and then through three lenses 15B, 15G, 15R, respectively. The transmission through the liquid crystal plates are each controllable. The lenses 15B, 15G and 15R are tilted to focus the three B, G, R light beams to the same spot on the projection picture screen 18 and form a single dot to the viewer. The appearance is the same as the dot-matrix display on an ordinary computer monitor. The transmissions through the crystal liquid plates 12B, 12G, 12R vary with time to form a motion picture.

Figure 4:
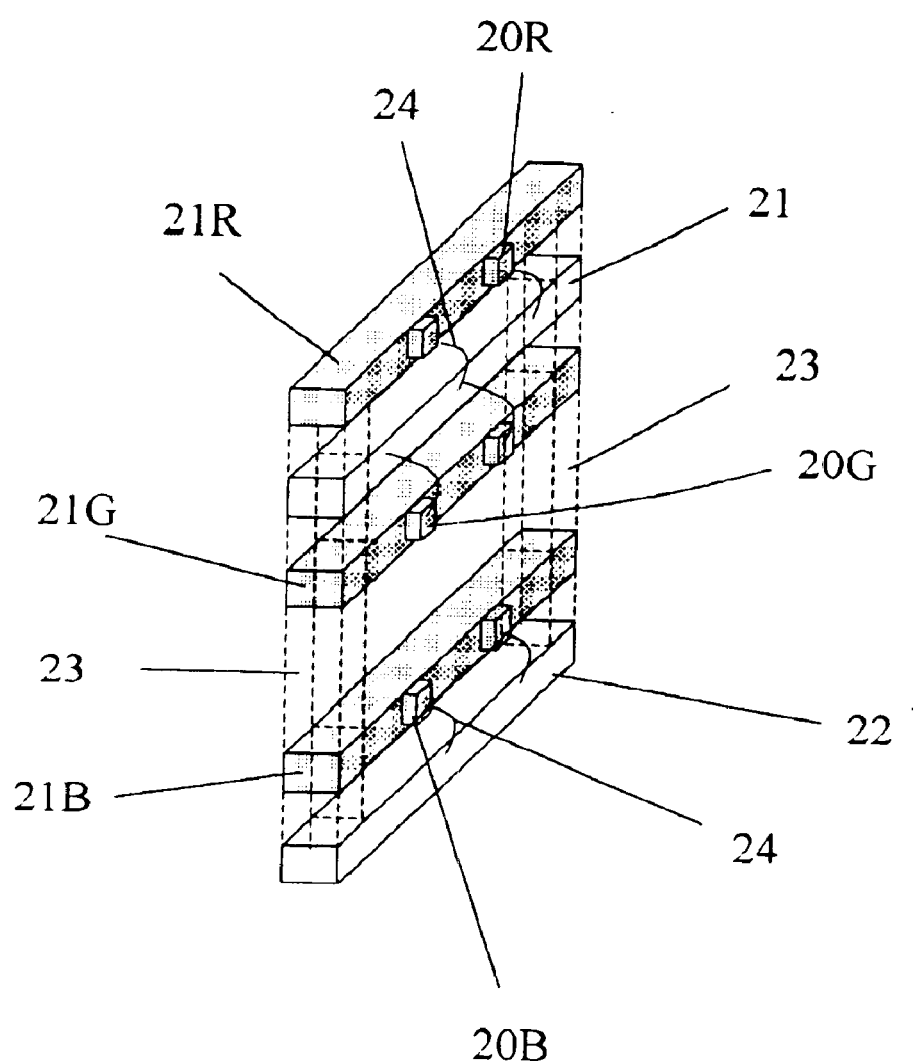
FIG. 4 shows the LED assembly of LED light source cells.

FIG. 4 shows the first embodiment of LED assembly of the light source cell in the matrix array. The blue LEDs 20B, the green LEDs 20G and the red LEDs 20R are mounted through respective bottom contacts (electrodes) on separate rows of metal rods 21B, 21G and 21R. The top electrodes of the green LEDs 20G and red LEDs are wire-bonded through wires 24 to metal rod 21 parallel to and interposed between rods 21R and 21G. The top electrodes of the blue LEDs 20B are wire-bonded through wires 24 to metal rod 22 below and parallel the metal rod 21B. The metal rods 21, 22, 21R, 21G, 211B are isolated from each other. Thus the row of red LEDs 20R and the row of the green LEDs 20G can be individually selected to be lighted with only three rows 21, 21R and 21G. The assembly is incorporated in a light source cell of the LED matrix.

Figure 5:
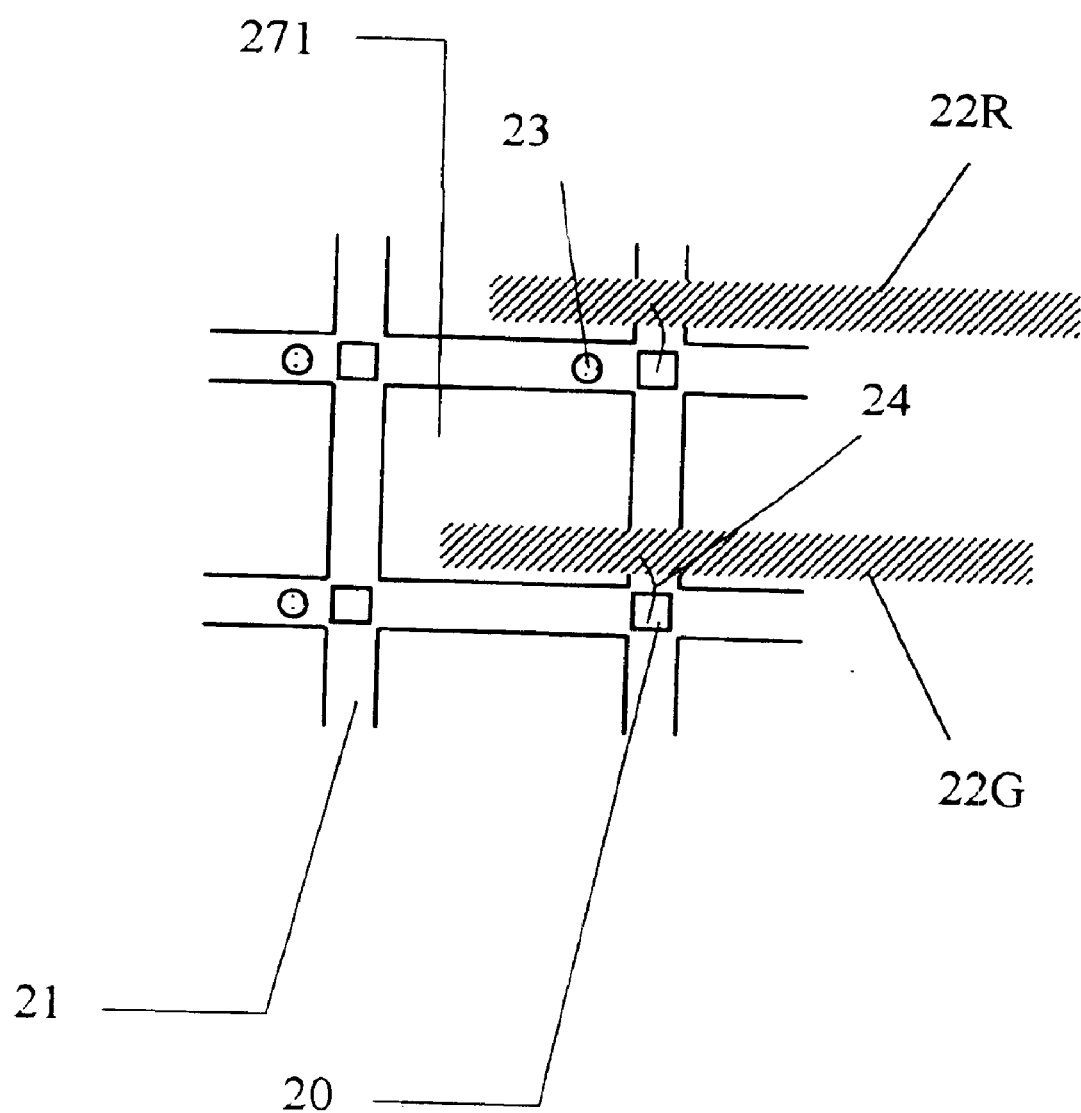
FIG. 5 shows a second embodiment of the LED assembly.

FIG. 5 shows a second embodiment of the LED assembly of the light source cell. The LED chip 20 is mounted with bottom electrode on a metal grid 21. The top electrodes of the LEDs are individually wire-bonded with wire 24 to respective red metal rod 22R and green metal rod 22G.

When single color light is to be displayed, all the LED can be of the same color chip. If different color is to be displayed, the three primary color LED chips should be mixed. For instance, all the LEDs coupled to the metal rod 22R can use the same color LED chips, such as red LED chips. All the LED chips coupled to the metal rod 22G can be of the same green LED chips. In the same manner, a set of blue LED chips can be added and coupled to a blue metal rod. By controlling the liquid crystal plates electronically, the emitted light can be selected and varied. The metal rods 22G, 22R and the metal grid are isolated from each other by means of insulator 23. The through holes 271 are for increasing air circulation to remove heat.

Figure 6:
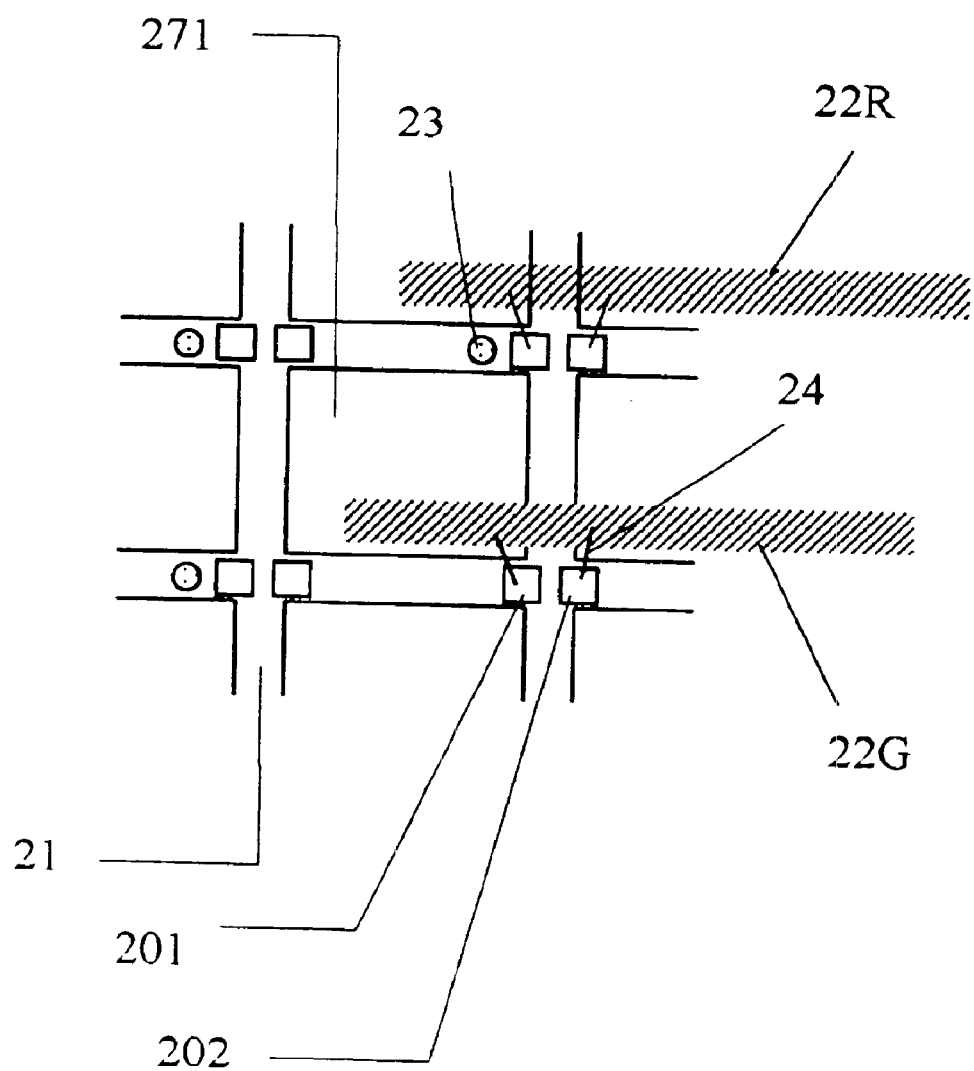
FIG. 6 shows a third embodiment of the LED assembly.

FIG. 6 show a third embodiment of the LED assembly of the light source cell. The difference from FIG. 5, is that LED chips 201, 202 are doubly mounted at each cross point and wire-bonded by wires 24 to respective metal rods 22G and 22R for the purpose of increasing the light intensity. The windows 271 between the metal grid are for increasing air circulation to remove heat.

Figure 7:
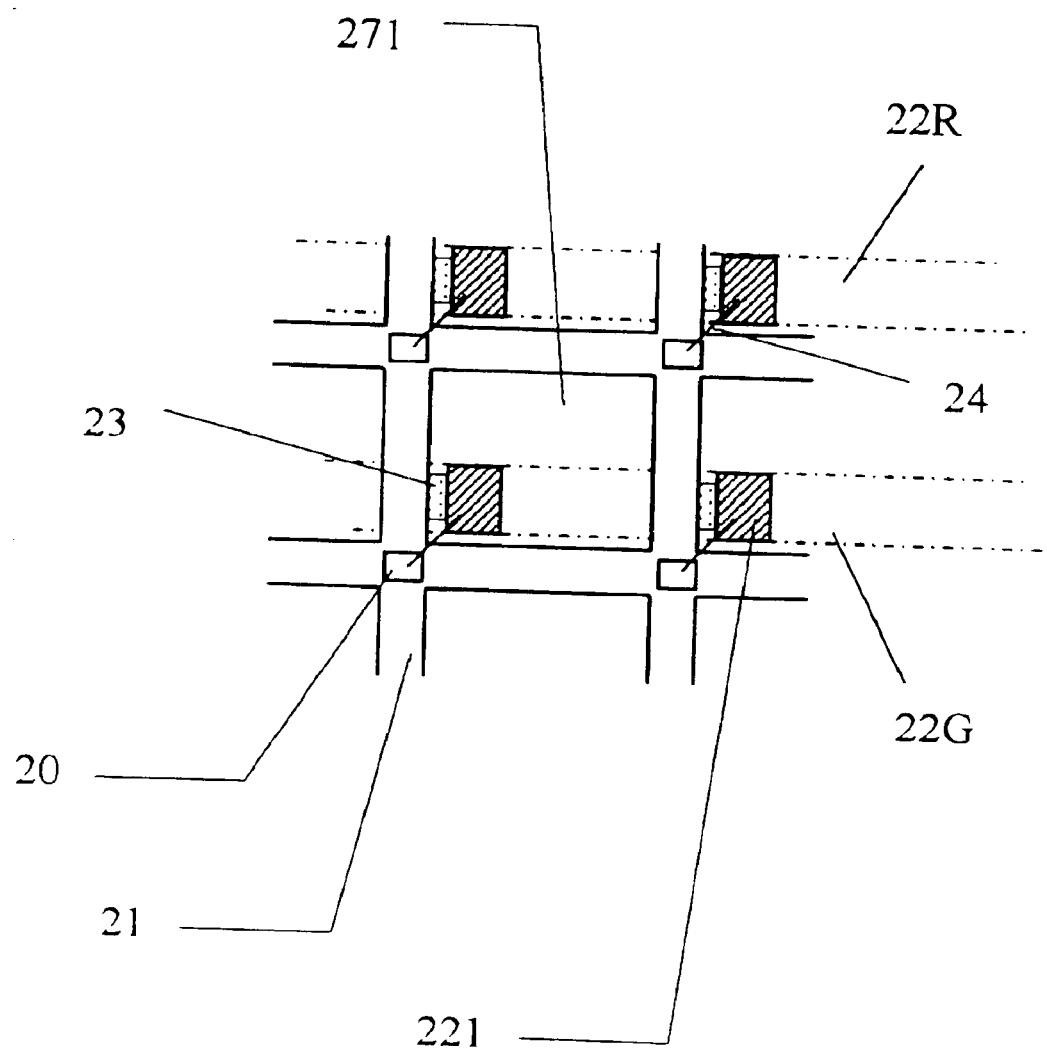
FIG. 7 shows a fourth embodiment of the LED assembly.

FIG. 7 shows a fourth embodiment of the LED assembly of the light source cell. Metal rods 22R, 22G are elevated over the metal grid 21, so that the top electrodes of the LEDs are at the same elevation as the metal rods 22R, 22G for easy wire-bonding by wires 24. The windows 271 serve the same purpose for increasing air circulation.

Figure 8:
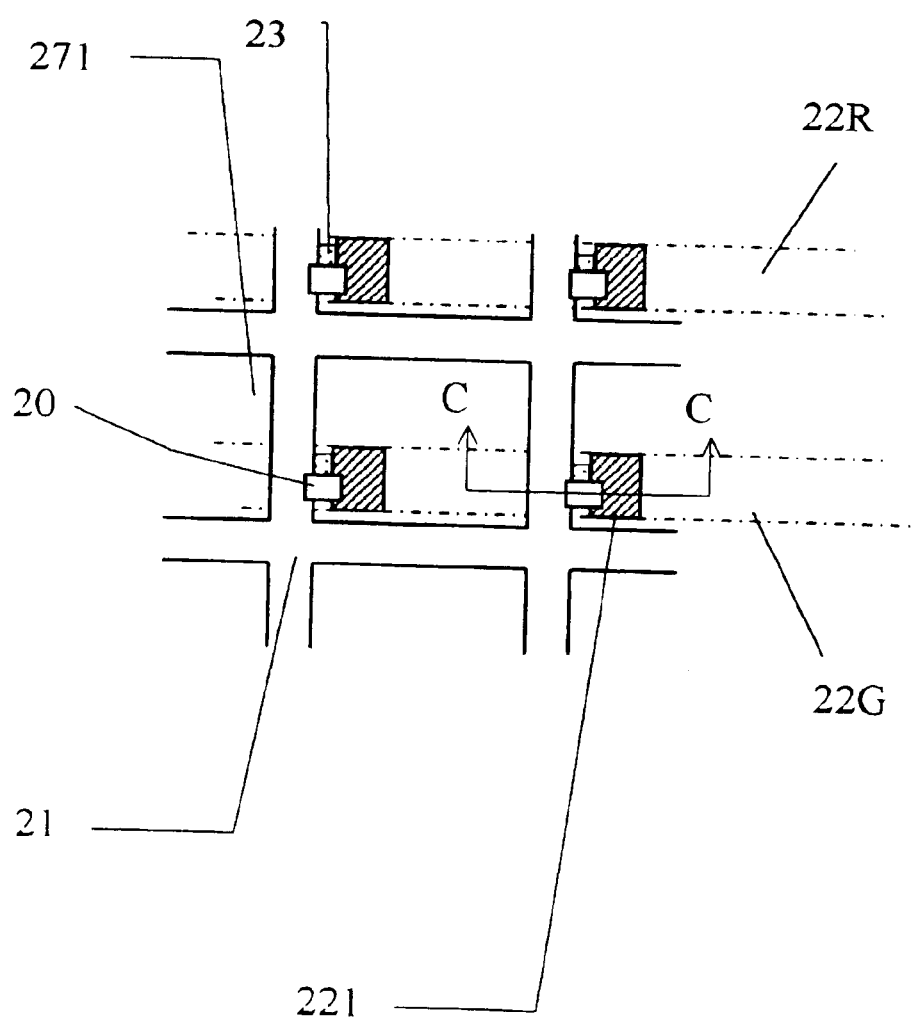
FIG. 8 shows a fifth embodiment of the LED assembly.
Figure 9:
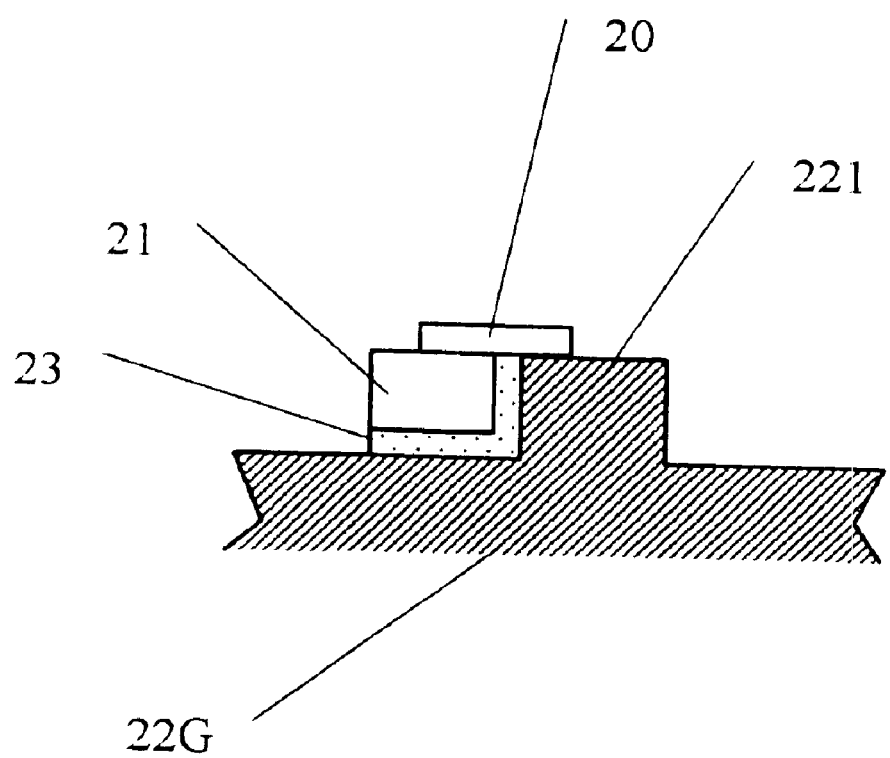
FIG. 9 shows a section view of FIG. 8.

FIG. 8 shows a fifth embodiment of the LED assembly of the light source cell. Each LED chip has two bottom electrodes and form a bridge between the metal rod such as 22R, 22G and metal grid 21. FIG. 9 show the cross-section view of the LED chip 20 bridging the pedestal 221 of the metal rod 22G and the metal grid 21. An insulator 23 is inserted between the pedestal 221 and the LED chip 21.

Figure 1:
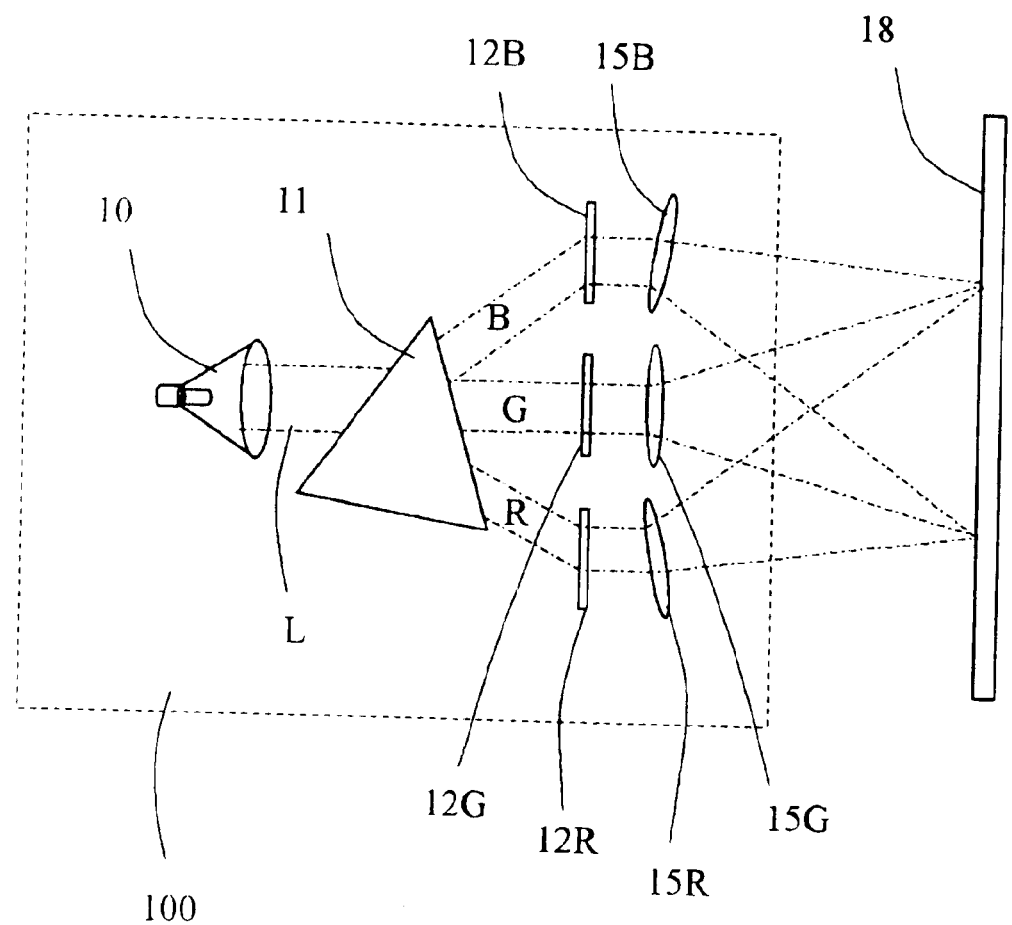
FIG. 1 shows the light source system of a prior art projector.
Figure 2:
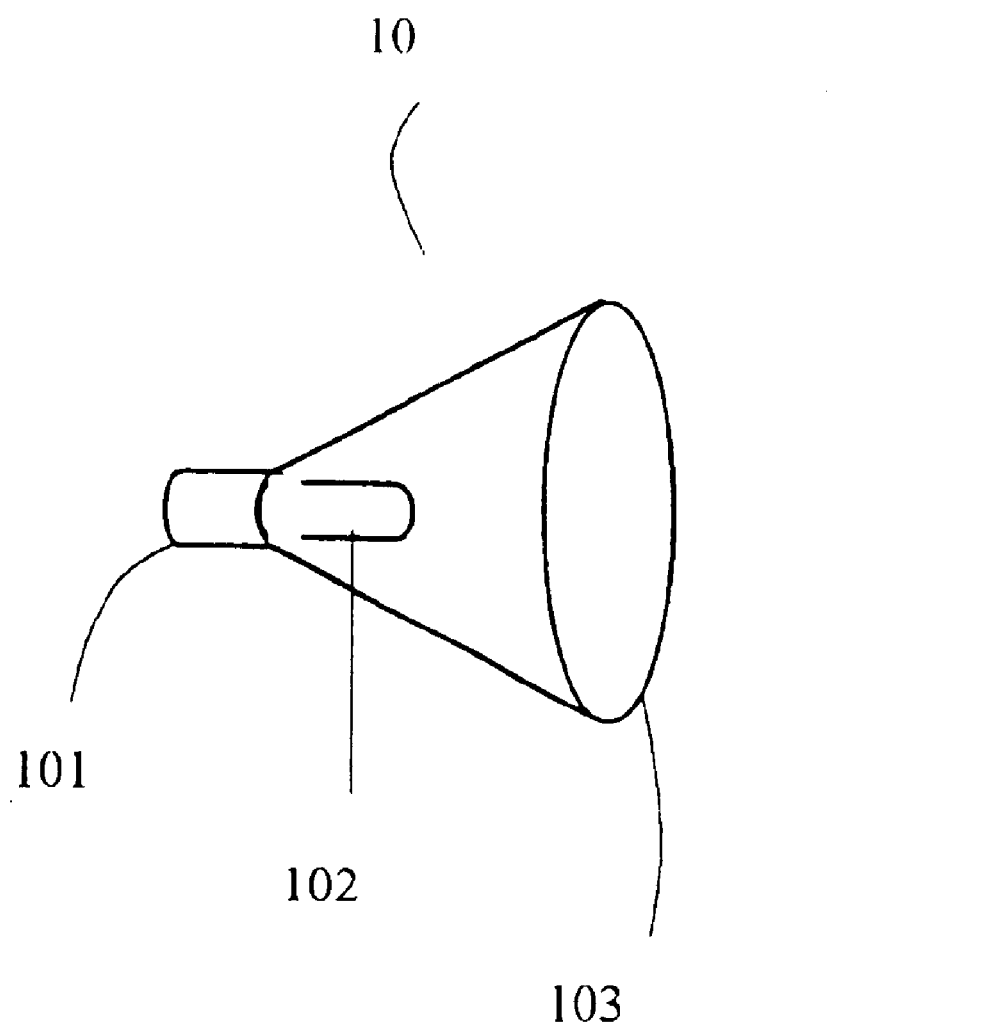
FIG. 2 shows the lamp for the prior art projector.
Figure 10:
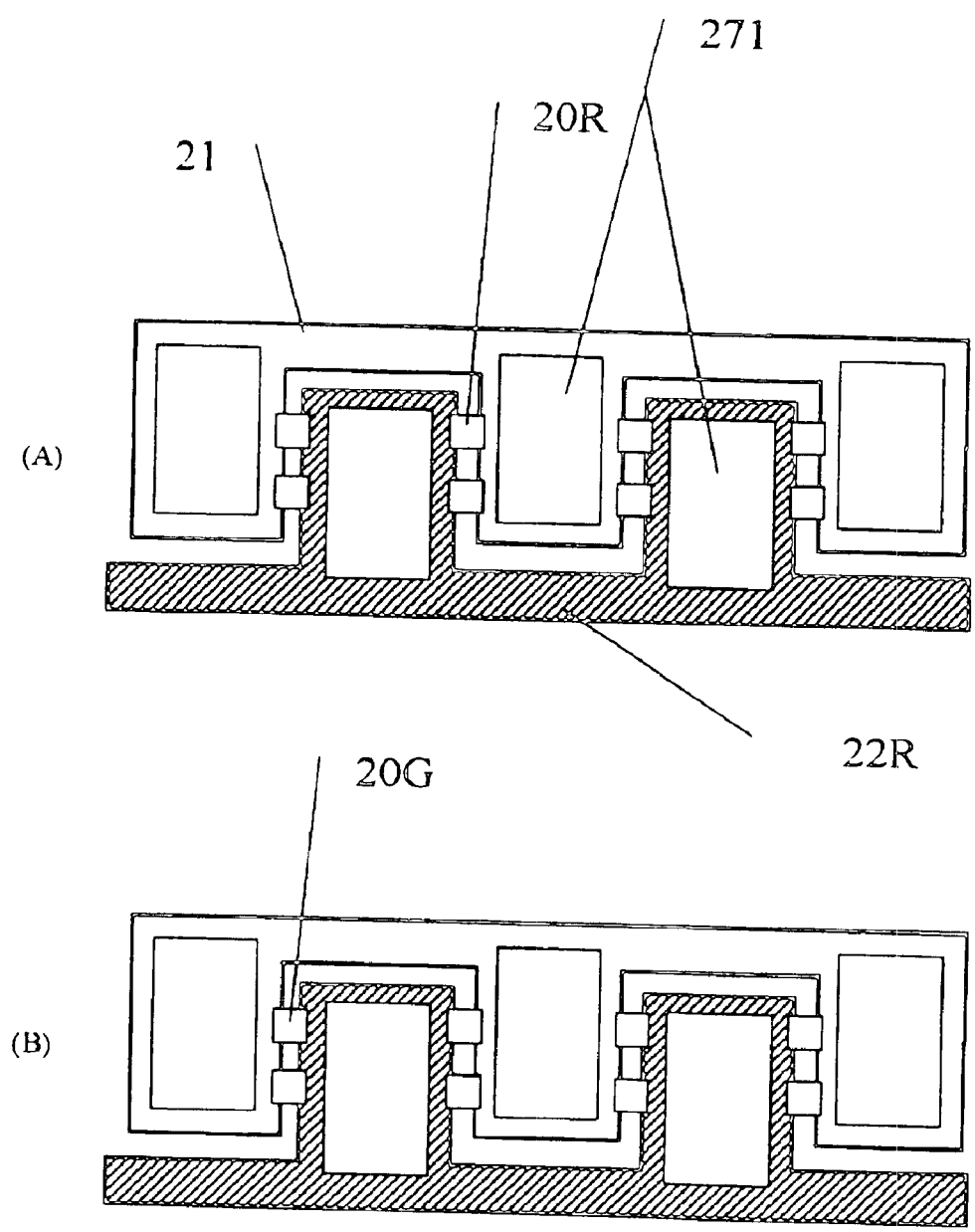
FIG. 10 shows a sixth embodiment of the LED assembly.

FIG. 10 shows a sixth embodiment of the LED assembly of the light source cell. The metal plate for the common electrodes 21 and the different color metal plates such as 22R in FIG. 1(A) are interdigitally meshed together and separated by a crevice. The LEDs 20R with bottom electrodes straddle over the crevice. Windows 271 in the metal plates 21 and 22R provide air circulation for heat removal. FIG. 10(B) is for green LED chips 20G.

FIG. 11 shows a seventh embodiment of the LED assembly of the light source cell. In FIG. 11(A), metal frames 211, 212, 213, 214 are connected in series in a strip by bridging the red color LEDs between the frames. The positive electrodes and the negative electrodes of the LEDs are alternately placed on the left side and the right side of adjacent frames so that the LEDs are connected in series. The red color LEDs 201R, 202R, 203R, 204R straddle between the adjacent frames. The window 271 in the frames facilitates air circulation to remove heat. FIG. 11(B) shows similar structure for green color LEDs 201G, 202G, 203G, 204G.

Figure 12:
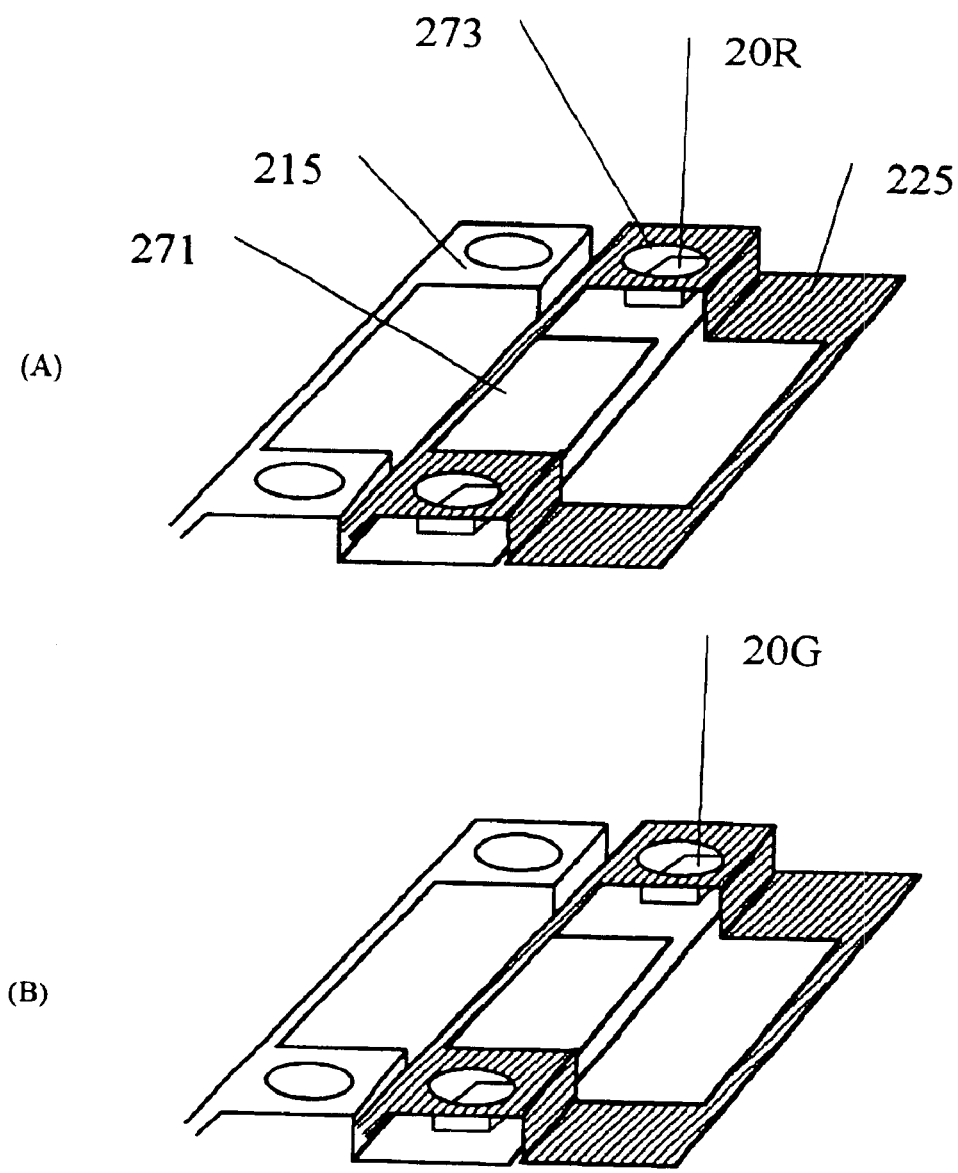
FIG. 12 shows an eighth embodiment of the LED assembly.

FIG. 12 shows an eighth embodiment of the LED assembly of the light source cell. The structure has two Z-shaped frames, with lower flange of one frame folded under the top flange of the other frame. One frame 215 is for mounting the bottom electrode of the red LED 20R, which is recessed under the top flange of the metal frame 225. The top flange of the frame 225 is in contact with the top electrode of the red LED 20R and has a small window 273 for the emitted light from the red LED 20R to radiate. Both the frames 215 and 225 have large windows 271 for air circulation. FIG. 12(B) shows a similar structure for green LED 20G.

Figure 13:
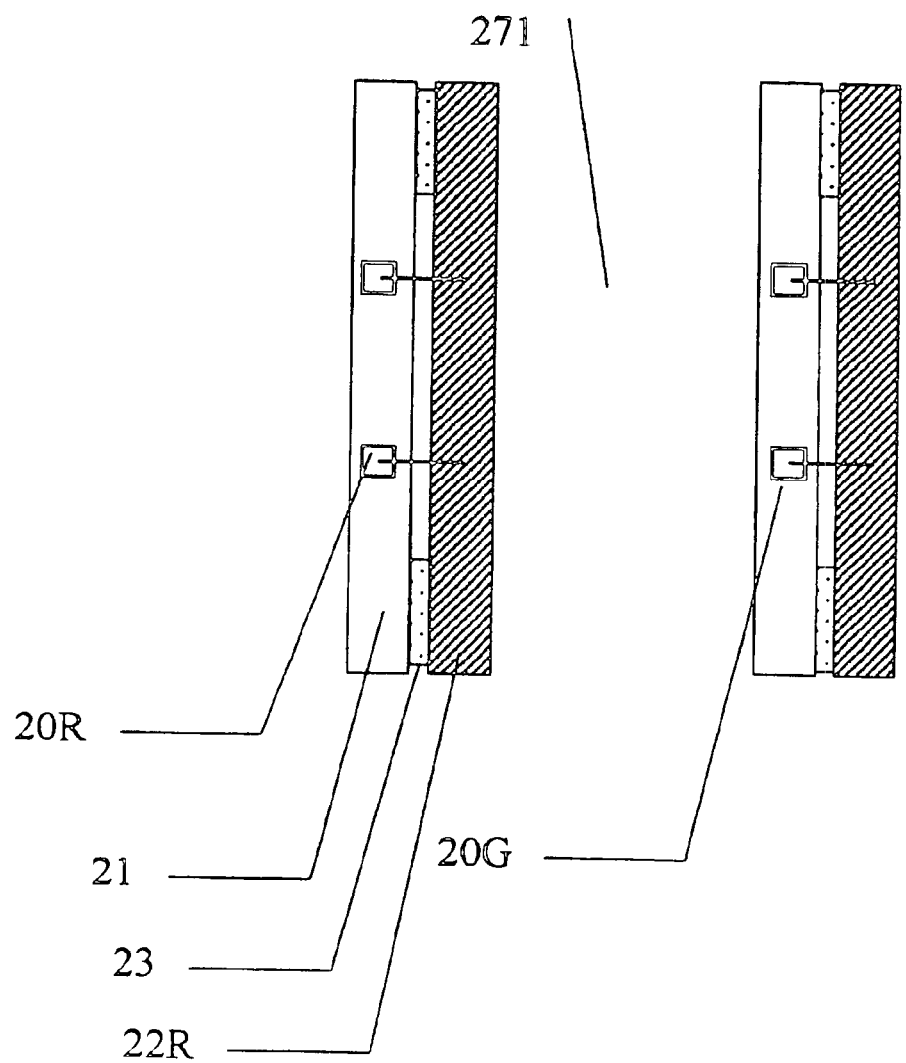
FIG. 13 shows a ninth embodiment of the LED assembly.

FIG. 13 shows a ninth embodiment of the LED assembly of the light source cell. Single color LEDs such as 20R with bottom electrodes are mounted on a metal strip 21, and the top electrodes are wire-bonded to a parallel metal strip 22R, which is separated from the metal strip 21 by means of insulating spacers 23. Another set of metal strips for green color LEDs 20G are placed away from the red color strip 22R. The space 271 between the red color strips and the green strip is for air circulation to remove heat.

Figure 14:
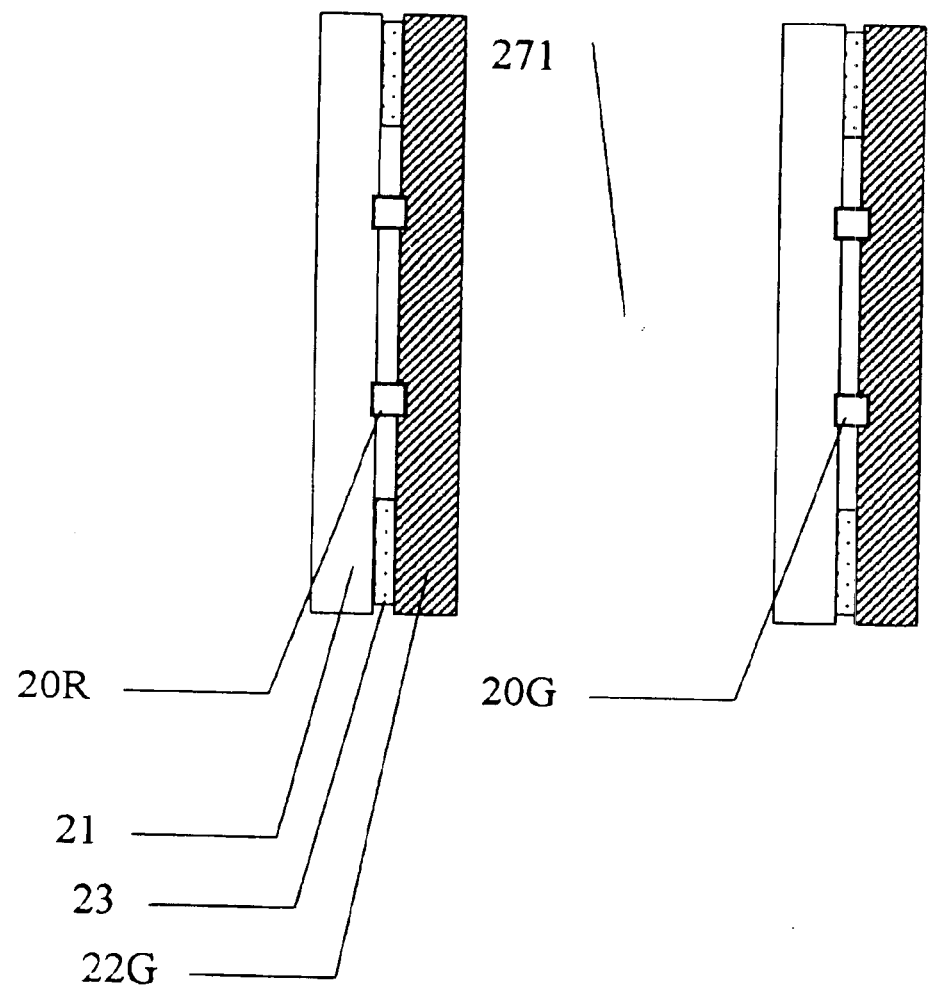
FIG. 14 shows a tenth embodiment of the LED assembly.

FIG. 14 shows a tenth embodiment of the LED assembly of the light source cell. Each single color LED such as red LED 20R has two bottom electrodes bridging over two parallel metal strips 21 and 22R and separated by insulating spacers 23. The green color LEDs 20G are attached to similar metal strips and placed away from the red LEDs. The space 271 between the metal strips for the red LEDs and the metal strips for the green LEDs 20G is for air circulation to remove heat.

Figure 15:
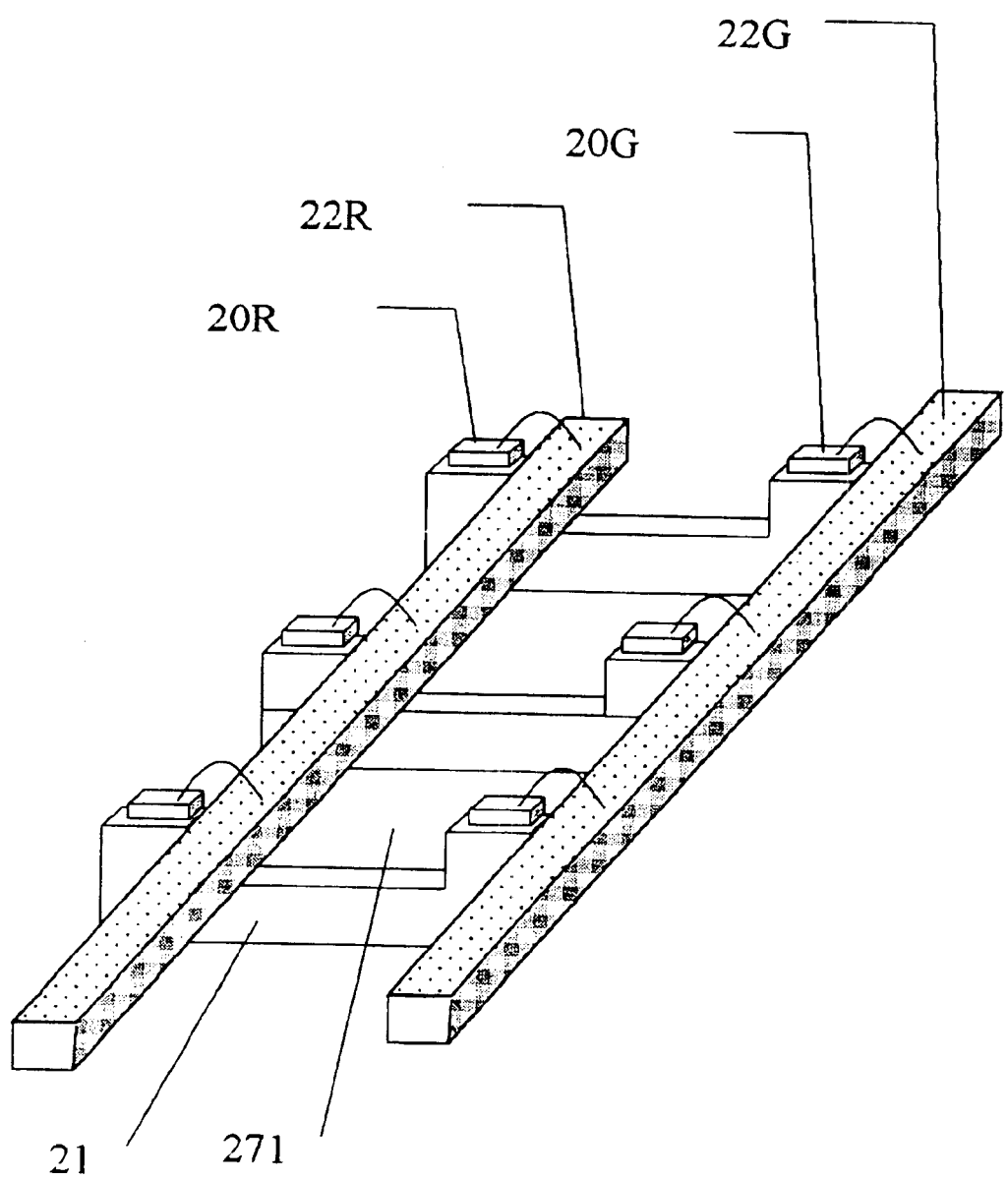
FIG. 15 shows an eleventh embodiment of the LED assembly.

FIG. 15 shows an eleventh embodiment of the LED assembly of the light source cell. The bottom electrodes of a particular color LEDs such as the red color LED 20R are mounted on more than one metal bracket 21. The top electrodes of the LEDs 20R are wire-bonded to a common metal rod 22R anchoring transversely in the brackets 21. The green color LEDs 20G are mounted on the same bracket 21 away from the red LEDs with top electrodes wire-bonded to a metal rod 22G. The space 271 between the rod 22R and the rod 22G is for air circulation to remove heat.

Figure 16:
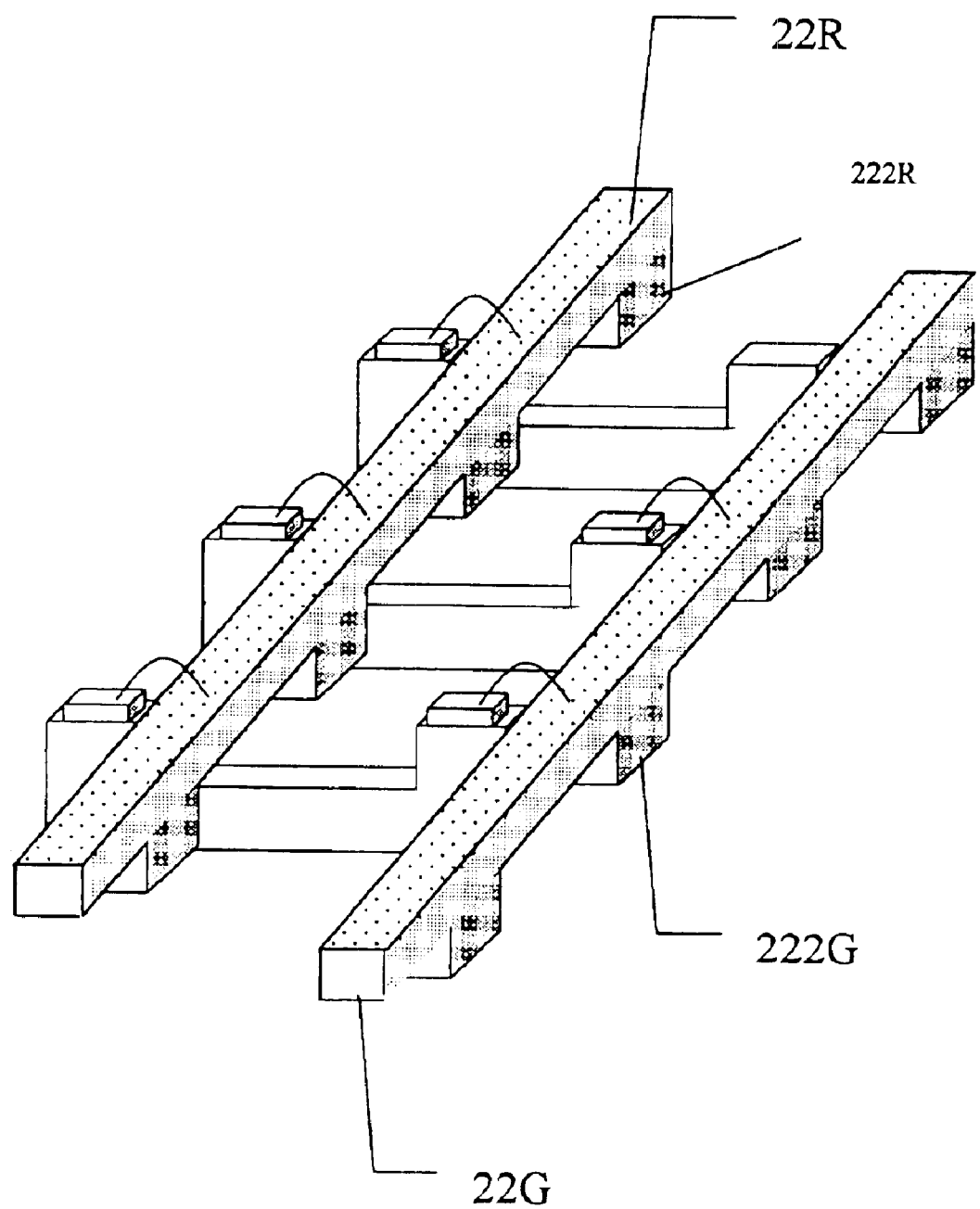
FIG. 16 shows a twelfth embodiment of the LED assembly.

FIG. 16 shows a twelfth embodiment of the LED assembly of the light source cell The structure is similar to that in FIG. 15, except that the metal rods such as 22R, 22G have extensions 222R, 222G, respectively underneath, to serve as heat sinks.

Figure 17:
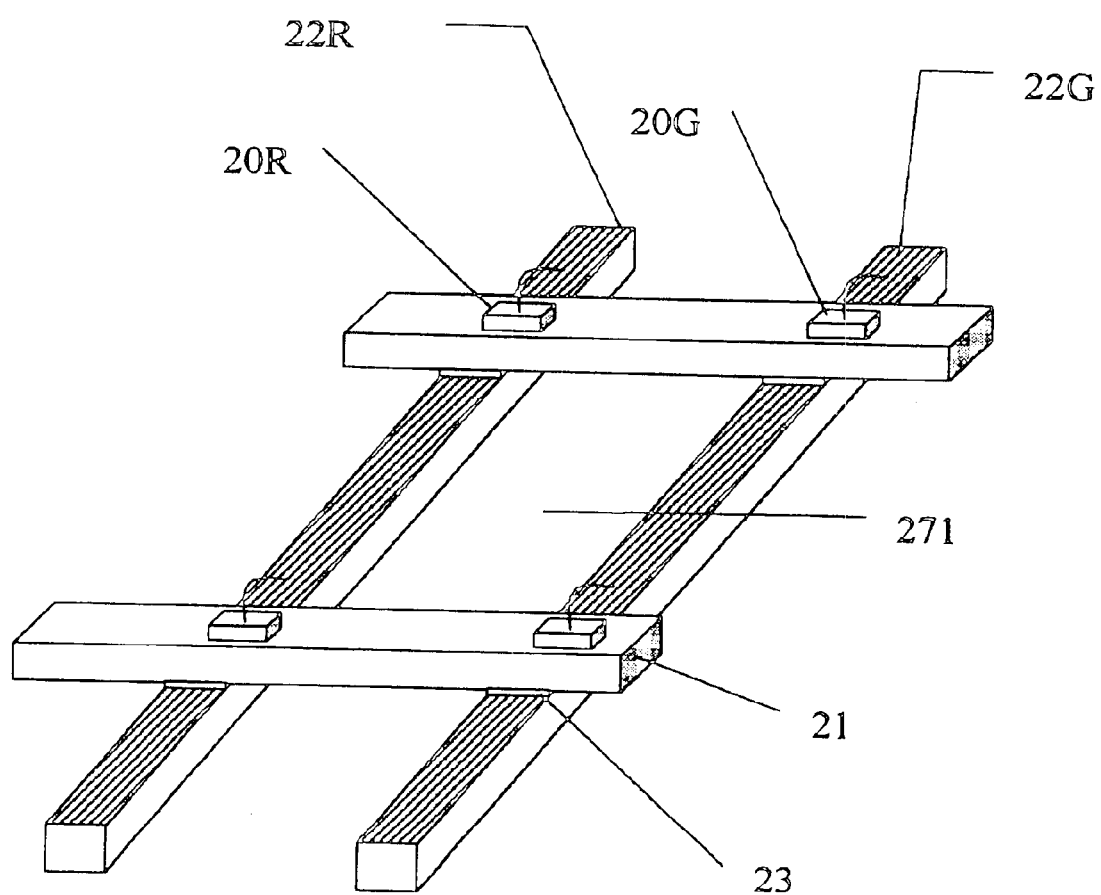
FIG. 17 shows a thirteenth embodiment of the LED assembly.

FIG. 17 shows a thirteenth embodiment of the LED assembly of the light source cell. The different color LEDs such as the red LEDs 20R and green color LEDs with bottom electrodes are mounted on parallel common metal bars 21 and resting on parallel orthogonal metal bars 22R, 22G. The orthogonal metal bars 22R, 22G are separated by insulators 23 from the common metal bars 21. The top electrodes of the same color red LEDs 20R are wire-bonded to the same orthogonal metal bar 22R, and the top electrodes of the green LEDs 20G are wire-bonded to the same orthogonal metal bar 22G. The space 271 between the orthogonal bars 22R and 22G is for air circulation to remove heat.

Figure 18:
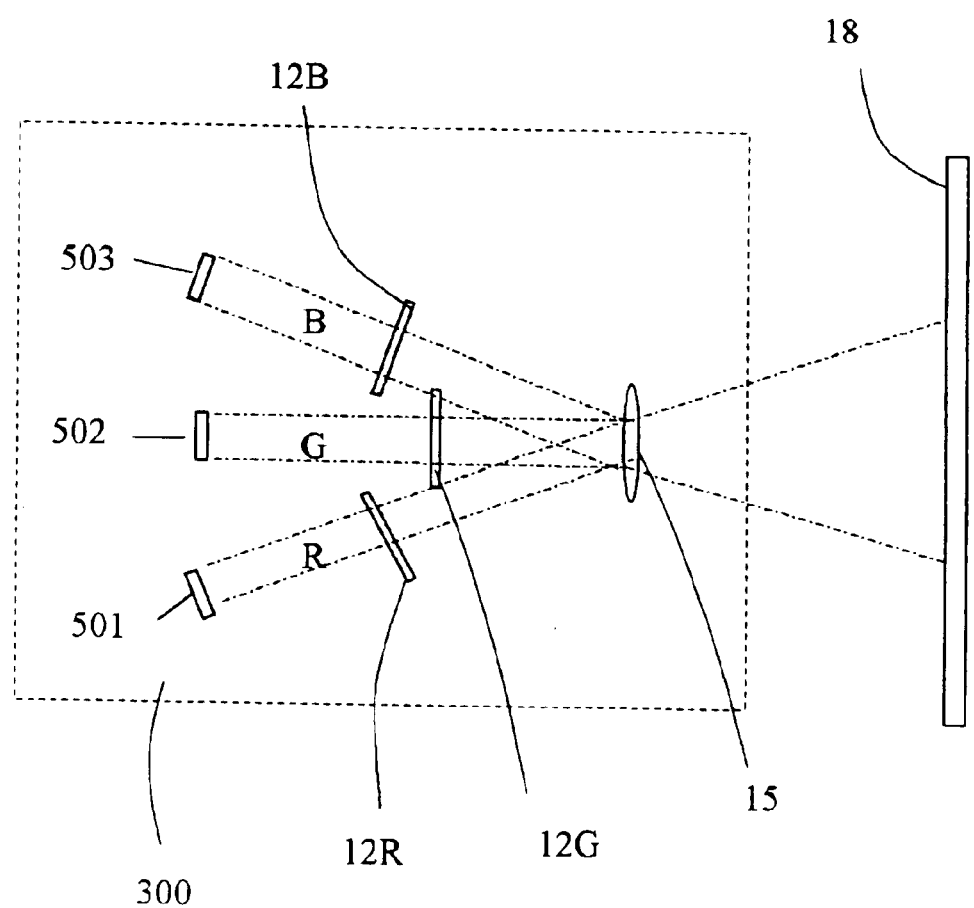
FIG. 18 shows a second version of the light source cell of the present invention.

FIG. 18 shows a second version of the light source cell 300 for the multi-color LED assemblies 501, 502, 503. The red light source 501, the green light source 502 and the blue light source 503 pixels are oriented differently to beam the emitted lights through three controllable liquid crystal plates 12R, 12G and 12B respectively toward a common focusing lens 15. The light beams merging from the focusing lens 15 is projected on a screen 18 to reproduce a picture. Compared with FIG. 3, this optical system requires only one focusing lens instead of three focusing lenses.

Figure 19:
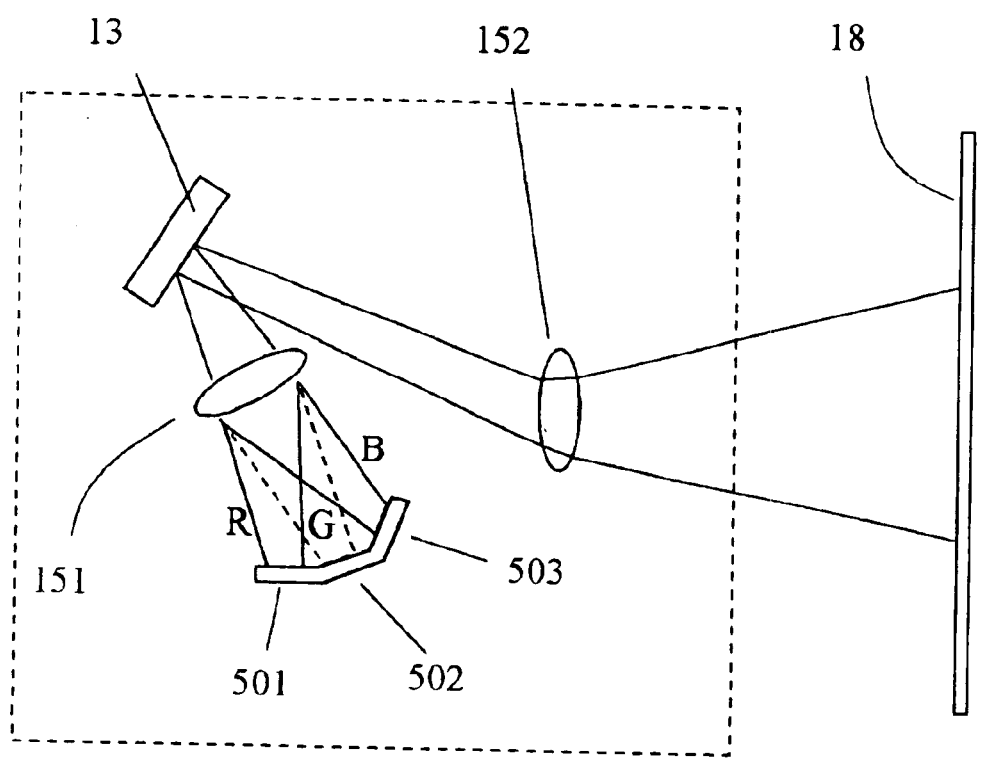
FIG. 19 shows a third version of the light source cell of the present invention.

FIG. 19 shows a third version of the light source cell with LED assembly 501 for red light, 502 for green light, and 503 for blue light. The light beams can be emitted together or sequentially, focused by the lens 151, and reflected by "Digital Micro-mirror Devices, DMD" or reflective liquid crystal plate. The DMD controls the amount of reflection according to input information. The reflected light from the DMD is properly bent to project the light onto a screen 18 to produce a picture. The changing R, G, B light beams resulting from the rapid changing of the DMD produces a motion picture.

Figure 20:
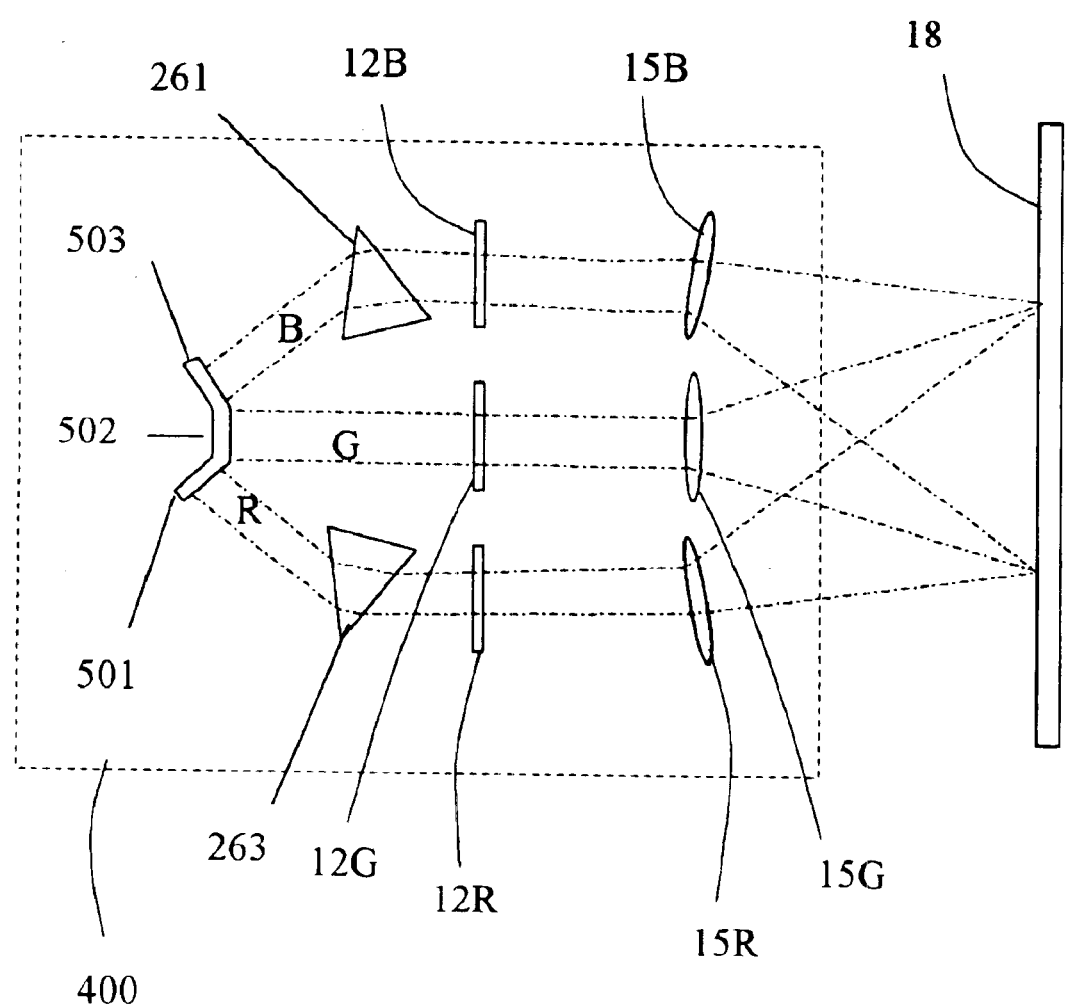
FIG. 20 shows a fourth version of the light source cell of the present invention.

FIG. 20 shows a fourth version of the light source cell 400 for the tri-color LED assembly 501 for red light, 502 for green light, and 503 for blue light. The emitted red light beam is bent by prism 263 and the emitted blue light is bent by prism 261, so that the red light beam, the green light beam and the blue light beam become parallel when they transmit past the respective programmable liquid crystal control plates 12R, 12G, 12B and focused by respective focusing lenses 15R, 15G, 15B. The focusing lenses 15R and 15B are tilted so that the focused tri-color light beams merged together on the projection screen 18. As the liquid-crystal plate programs change with picture content, a motion picture is displayed on the screen.

Figure 21:
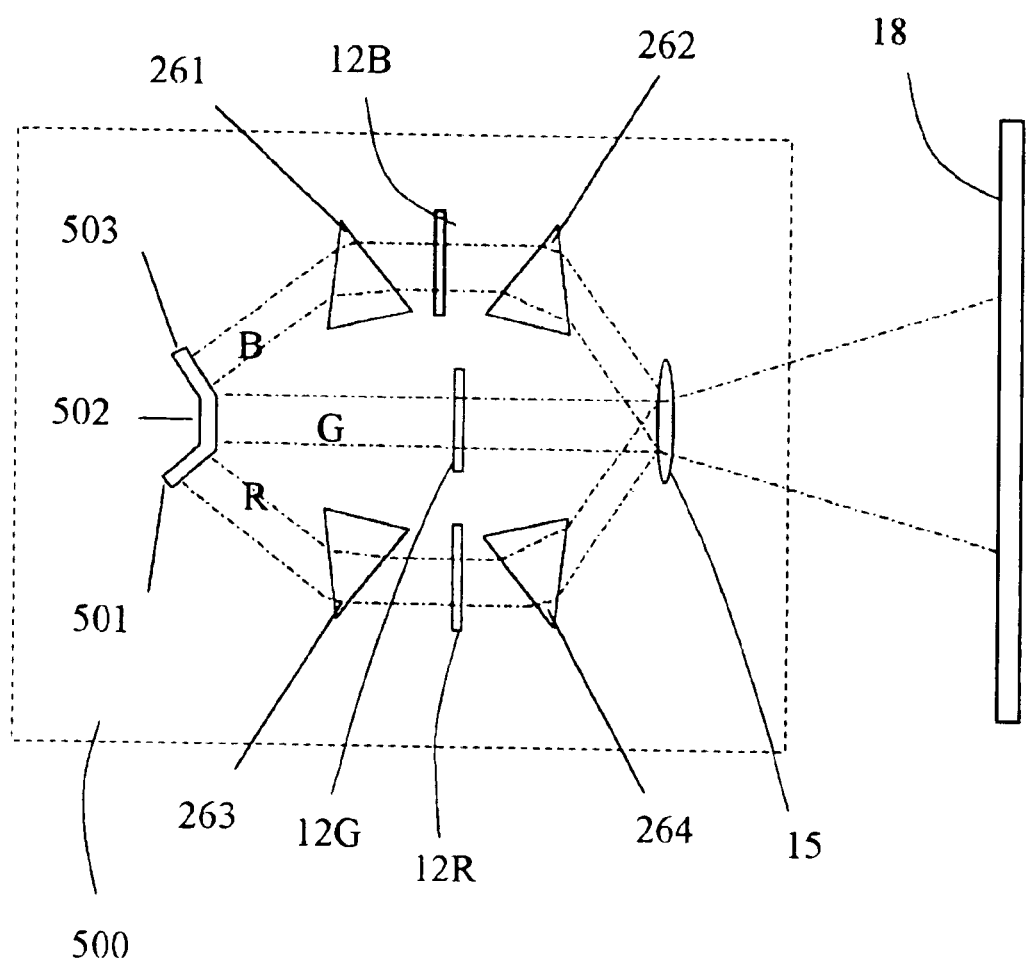
FIG. 21 shows a fifth version of the light source cell of the present invention.

FIG. 21 shows a fifth version of the light source cell 500 for the tri-color LED assembly 501 for red light, 502 for green light, and 503 for blue light. The red light beam R is bent by prism 263, transmitted through a programmable liquid crystal plate 12R, and bent again by prism 264 to merge with the green light beam through the programmable liquid crystal plate 12G at the focusing lens 15. Similarly the blue light beam B is bent by prism 261, transmitted through a programmable liquid plate 12B, and bent again by prism 262 to merge with the green light beam through the liquid crystal plate 12G at the focusing lens 15. The focused merging light is then projected on a screen to produce a spot of a picture. As the liquid crystal programs change, the picture becomes a motion picture.

Figure 22:
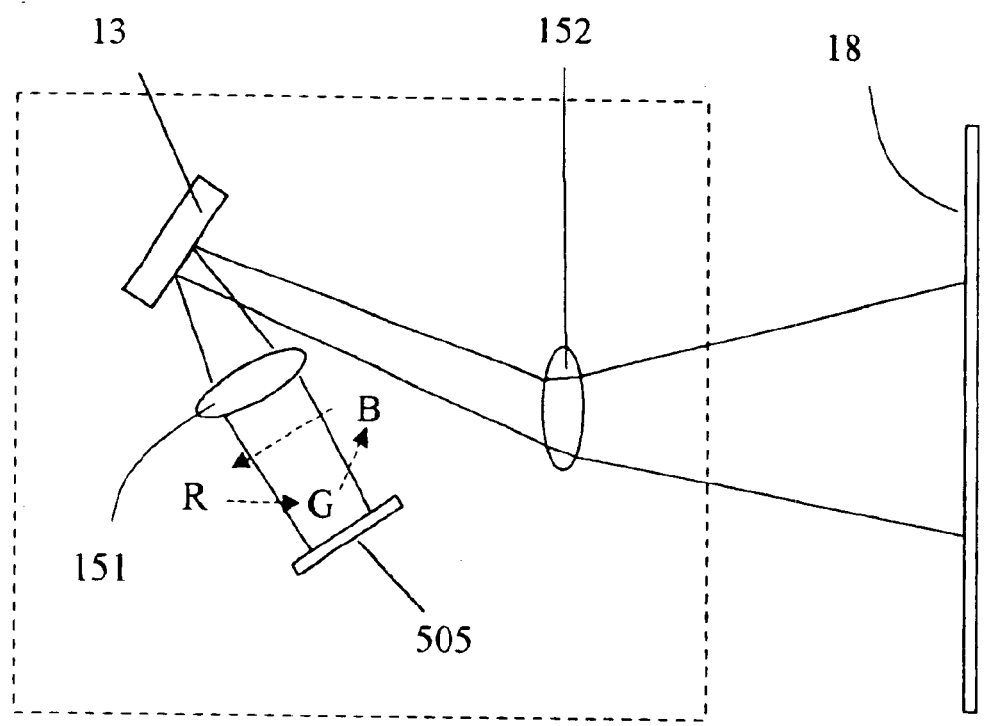
FIG. 22 shows a sixth version of the light source cell of the present invention.

FIG. 22 shows a sixth version of the light source cell for the single-gun tri-color LED assembly 505. The red, green and blue light beams are sequentially transmitted through a focusing lens 151, reflected by a programmable DMD 13 bent by lens 153 to project the light beam onto a projection screen 18. The amount of reflection by the DMD 13 is programmable and controlled by the picture content. As the programs change, the projected picture becomes a motion picture.

While the preferred embodiment of the invention have been described, it will be apparent to those skilled in the art, that various modifications may be made without departing from the spirit of the present invention. Such modifications are all within the scope of this invention.

What is claimed is:

1. A picture projection system, comprising:

a projection screen;

a plurality of cells arranged in matrix array serving as light source for projection of picture on said screen, each one of said cells having a light emitting diode (LED) assembly of red LEDs, green LEDs and blue LEDs, programmable control means to control the amount of light transmission from each one of said LED, and merging and focusing means to project the transmitted light onto said projection screen as a pixel, wherein each one of said LED has a top electrode and a bottom electrode, and said LED assembly has:

a common metal grid on which the bottom electrodes of all said LEDs make contact with the red LEDs occupying a first row of said grid, the green LEDs occupying a second row of said grid, and the blue LEDs occupying a third row of said grid, a first metal bar in parallel with the first row of said metal grid to which the top electrodes of said red LEDs are wire-bonded, a second metal bar in parallel with the second row of said metal grid to which the top electrodes of said green LEDs are wire-bonded, a third metal bar in parallel with the third row of said metal grid to which the top electrodes of said blue LEDs are wire-bonded, and spaces between said metal bars for cooling air to circulate.

2. The picture projection system as described in claim as described in claim 1, where two said LEDs are clustered together on each row of the grid to increase light intensity.

3. The picture projection system as described in claim 1, wherein each of said first metal bar, said second metal bar and said third metal bar has a pedestal raised to the same elevation of said grid to shorten the distance for wire-bonding to respective LED.

4. A picture projection system, comprising:

a projection screen;

a plurality of cells arranged in matrix array serving as light source for projection of picture on said screen, each one of said cells having a light emitting diode (LED) assembly of red LEDs, green LEDs and blue LEDs, programmable control means to control the amount of light transmission from each one of said LED, and merging and focusing means to project the transmitted light onto said projection screen as a pixel, wherein each of the LEDs has a first bottom electrodes and a second bottom electrode, and the LED assembly has a common metal grid to which all said first bottom are connected, a first metal bar in parallel with the first row of said metal grid to which the second electrodes of said red LEDs are connected, a second metal bar in parallel with the second row of said metal grid to which the second electrodes of said green LEDs are connected, the metal bars are placed underneath the metal grid and have pedestals raised to the same elevation of said grid for connecting with said second bottom electrodes, and spaces are opened between metal bars for cooling air to circulate.

5. The picture projection system as described in claim 4, wherein an insulator is inserted underneath each one of said LEDs, between said metal grid and one of said first metal bar, and between said metal grid and said second metal bar.

6. A picture projection system comprising:

a projection screen;

a plurality of cells arranged in matrix array serving as light source for projection of picture on said screen, wherein each one of said cells having a light emitting diode (LED) assembly of red LED, green LEDs and blue LEDs, programmable control means to control the amount of light transmission from each one of said LED, and merging and focusing means to project the transmitted light onto said projection screen as a pixel, and wherein each one of said LEDS has a top electrode and a bottom electrode, and each LED assembly is structured:

with the bottom electrodes of the red LEDs contacting the lower flange of a first Z-shaped metal frame and the top electrodes of the red LEDs contacting the upper flange of a second Z-shaped metal frame which has a window for emitted light to beam through;

with the bottom electrodes of the green LEDs contacting the lower flange of a third Z-shaped metal frame and the top electrodes of the green LEDs contacting the upper flange of a fourth Z-shaped metal frame which has a window for emitted green light to beam through;

with the bottom electrodes of the blue LEDs contacting the lower flange of a fifth Z-shaped metal frame and the top electrodes of the blue LEDs contacting the upper flange of a sixth Z-shaped metal frame which has a window for emitted blue light to beam through, said first, second, third, fourth, fifth and sixth Z-shaped metal frame each having a air space for heat removal.

7. A picture projection system, comprising:

a projection screen;

a plurality of cells arranged in matrix array serving as light source for projection of picture on said screen, each one of said cells having a light emitting diode (LED) assembly of red LEDs, green LEDs and blue LEDs, programmable control means to control the amount of light transmission from each one of said LED, and merging and focusing means to project the transmitted light onto said projection screen as a pixel, wherein each LED has a bottom electrode and a top electrode, and each LED assembly has:

more than one parallel metal brackets serving as common terminal for said LEDs;

a first metal bar orthogonal to and insulated from said metal brackets and wire-bonded to the top electrodes of the red LEDs;

a second metal bar orthogonal to and insulated from said metal brackets and wire-bonded to the top electrodes of the green LEDs;

a third metal bar orthogonal to and insulated from said metal brackets and wire-bonded to the top electrodes of the blue LEDs;

first set of through air spaces between said first metal bar and said second metal bar for heat removal, and second set of through air spaces between said second metal bar and said third metal bar for heat removal.

8. The picture projection system as described in claim 7, wherein said first metal bar, second metal bars and third metal bars have bottom extensions to serve as heat sinks.

* * * * *